Aug. 19, 1947.  E. W. DAVIS  2,425,867
LUBRICATING APPARATUS
Filed Sept. 20, 1945   2 Sheets-Sheet 1
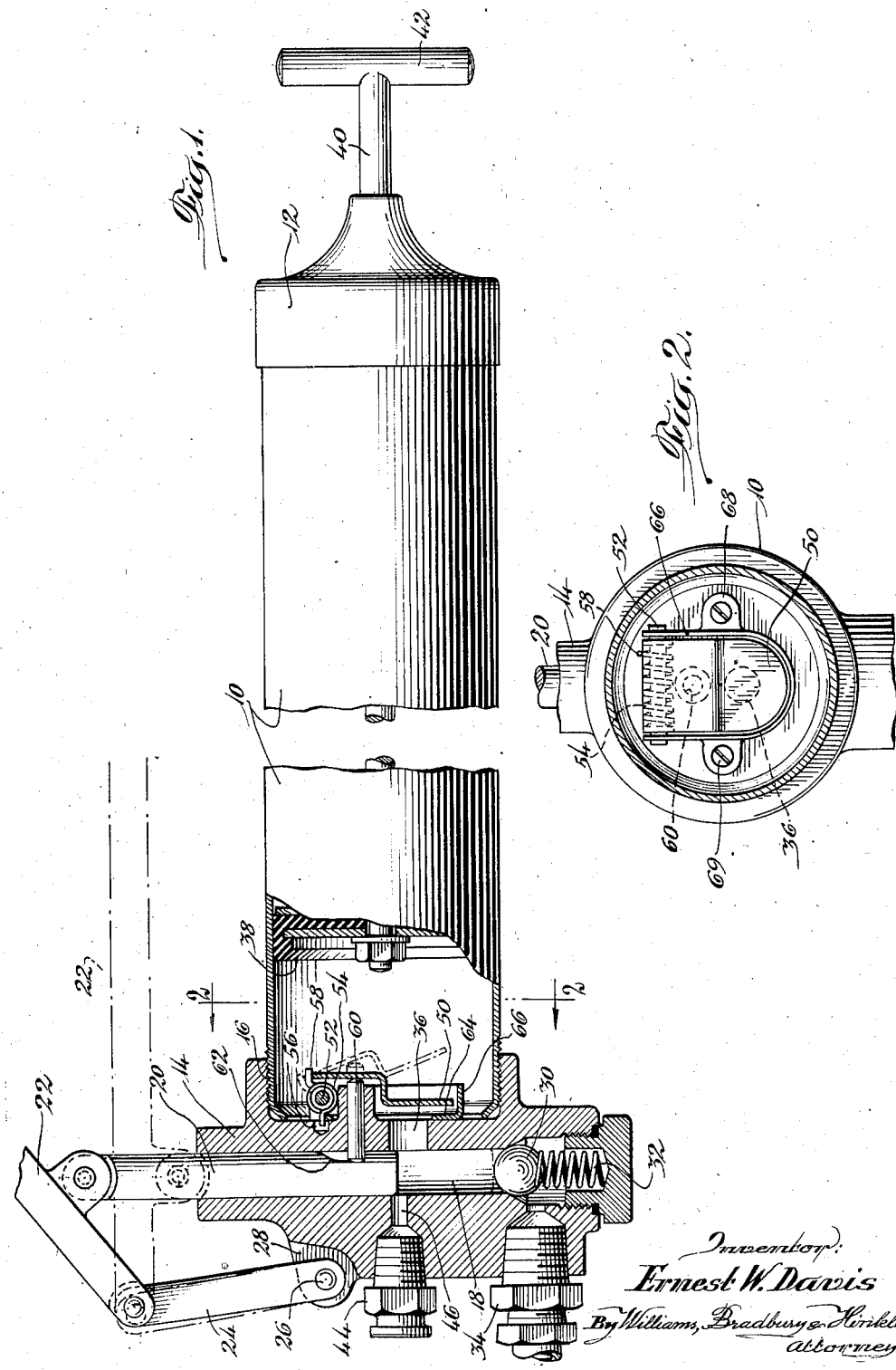
Inventor:
Ernest W. Davis
By Williams, Bradbury & Hinkle
Attorneys.

Aug. 19, 1947.     E. W. DAVIS     2,425,867
LUBRICATING APPARATUS
Filed Sept. 20, 1945     2 Sheets-Sheet 2
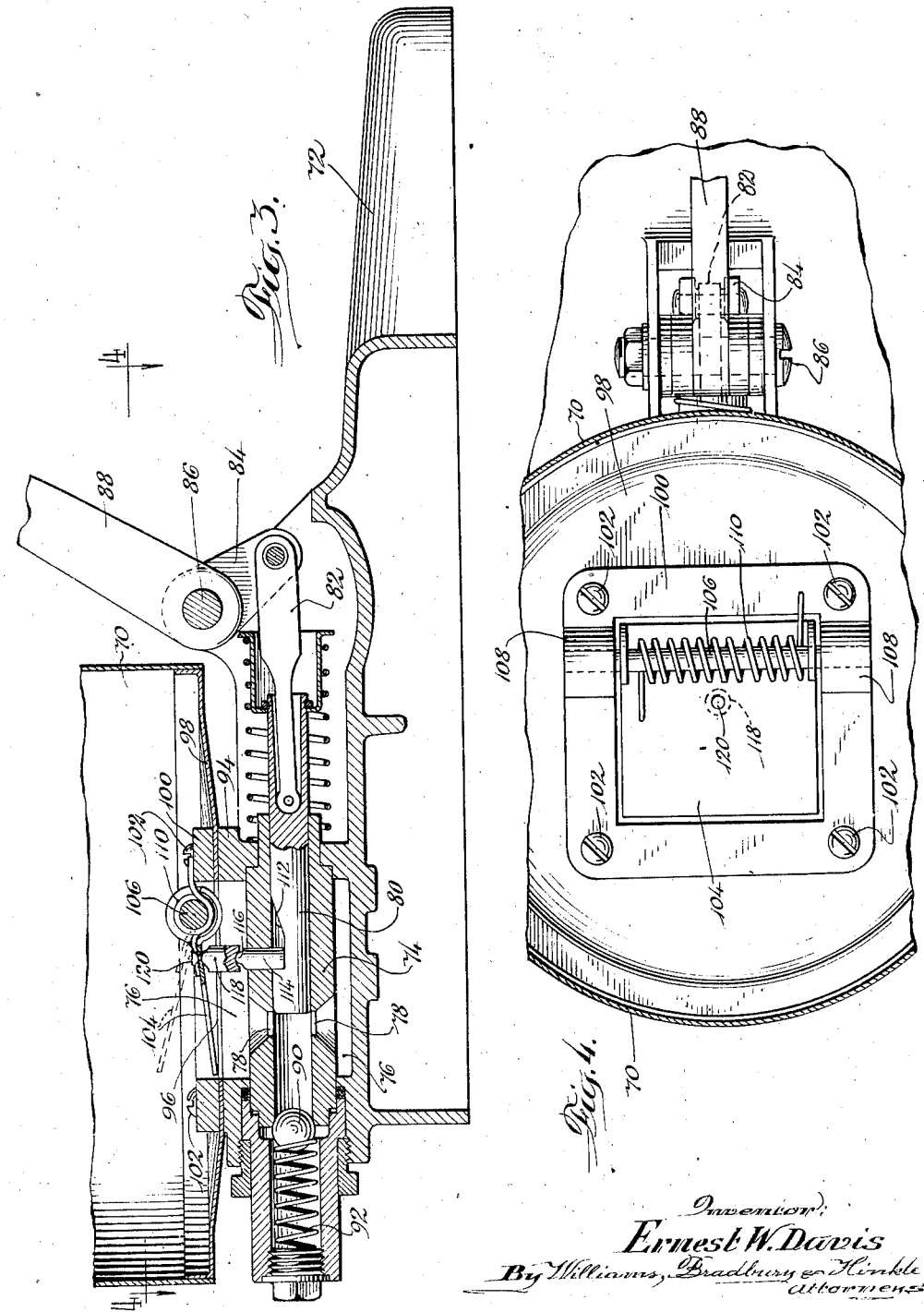
Inventor:
Ernest W. Davis
By Williams, Bradbury & Hinkle
Attorneys.

Patented Aug. 19, 1947

2,425,867

UNITED STATES PATENT OFFICE 2,425,867

LUBRICATING APPARATUS

Ernest W. Davis, River Forest, Ill.

Application September 20, 1945, Serial No. 617,545

8 Claims. (Cl. 222—231)

This invention relates generally to lubricant compressors, and more particularly to hand operated grease guns of the lever type.

One object of the invention is to provide an improved grease gun, the operation of which will not be disadvantageously affected by the presence of air pockets. To attain this object, the invention provides means for intermittently packing the grease from the reservoir into the high pressure cylinder.

More specifically, it is an object of the invention to provide mechanically actuated paddle or flapper means operating in the vicinity of the port which connects the grease reservoir with the high pressure cylinder of a grease gun and actuating said means intermittently by the motion of the grease expelling piston for packing grease into the high pressure cylinder and eliminating air pockets therefrom.

Other objects of the invention will appear from the following description taken in connection with the accompanying drawings, in which:

Fig. 1 is a side elevational view of a grease gun embodying this invention with a portion of the structure shown in axial section;

Fig. 2 is a transverse sectional view taken as indicated at line 2—2 on Fig. 1;

Fig. 3 is a fragmentary vertical sectional view showing the invention in slightly modified form as applied to another type of grease gun;

Fig. 4 is a transverse sectional view taken as indicated at line 4—4 on Fig. 3.

The grease gun shown in Figs. 1 and 2 is of the portable hand operated type and includes a cylindrical reservoir 10 closed at one end by a cap 12 and at the other end by a cast head 14 into which the end of the cylinder 10 is threaded at 16. The head 14 is formed with a bore 18 which constitutes the high pressure cylinder and in which a piston or plunger 20 is reciprocable by means of a hand lever 22 fulcrumed at one end of the link 24 which is attached at its opposite end by a pivot 26 to a lug 28 on the head 14.

The high pressure cylinder 18 is fitted with a check valve 30 seated inwardly by a spring 32 and yielding to permit the discharge of grease through an outlet fitting 34 which may be connected with any suitable form of discharge terminal or conduit. The cylinder 18 communicates with the interior of the reservoir 10 by way of a port 36 in the head 14 and the grease in the reservoir is urged toward the port by means of a spring-pressed follower piston 38. A guide rod 40 is connected to the piston and extends through a central opening in the cap 12 and this rod is provided with a handle 42 which adapts the piston 38 to be drawn toward the cap 12 for filling the reservoir 10 with grease by suction, operating through an inlet fitting 44 and passage 46. Features thus far described are conventional and need not be further elaborated.

In a device of this general type it sometimes happens that the mass of grease in the reservoir 10 develops voids or air pockets which interfere with the steady discharge of grease from the cylinder 18. To prevent this, the present invention provides a paddle or flapper member 50 hingedly mounted at 52 and extending over and adjacent the port 36 so that it may swing toward and from the port about its hinge pivot. To actuate the flapper 50, a spring 54 is coiled about the hinge pivot 52 with one end of the spring engaged in a recess 56 in the head 14 and with the opposite end 58 engaging the flapper 50 at a short distance from the axis of the pivot 52. The spring thus urges the flapper toward the port 36; a pin 60, slidably guided in the head 14, is disposed with one end engaging the flapper 50 and with its opposite end positioned to engage a cam surface 62 formed on the plunger 20 by cutting away a portion of the plunger and inclining the bottom of the cut with respect to the axis of the plunger. The cam surface 62 is so positioned that it actuates the pin 60 to swing the flapper 50 away from the port 36 during the working stroke of the plunger by which it feeds grease from the cylinder 18 through the outlet 34. Then, on the return stroke of the plunger and as it uncovers the port 36, the cam 62 permits the spring 54 to swing the flapper 50 toward the port 36 so as to force and pack the grease through the port and into the cylinder 18 ready for the next feeding stroke. This packing action of the flapper 50 applies pressure to the grease which operates to break down the walls of any voids and to collapse any air pockets therein, dispersing the air and forming the grease into a homogeneous mass in the cylinder 18.

The effectiveness of the flapper 50 is increased by providing in the end of the barrel or reservoir 10 a cupped fitting 64 having a flange 66 which extends peripherally adjacent the flapper 50 as it approaches the port 36. A considerable charge of grease is thus accumulated in the space enclosed by the flange 66, and the paddle 50, moving into this space in which the grease is more or less confined, operates to force it through the port 36. As indicated in Fig. 2, the flange 66 is U-shaped in outline and its parallel straight portions serve to support the hinge pivot 52 on which the flapper 50 is fulcrumed. The fitting 64 includes ears 68 perforated to receive securing screws 69 by which the fitting is attached to the head 14.

Figs. 3 and 4 illustrate the invention as applied to a lubricant compressor in which the reservoir cylinder or barrel 70 is disposed with its axis upright and is supported on a base 72 which carries the high pressure cylinder 74 in a pocket or cavity 76 which extends around the cylinder and communicates therewith through a pair of opposite ports 78, 78. The piston or plunger 80 operating in the cylinder 74 is actuated by a pitman 82 connected to a lever 84 which is fulcrumed at 86 on the base 72 and includes an operating arm 88 extending upwardly from the base. In its working stroke the plunger 80 first covers the ports 78 and then forces a charge of grease from the cylinder 74 past the check valve 90 and through the outlet passsage 92.

The upper side of the cavity 76 is defined by a rectangular boss 94 on the base 72 and the square opening in the boss 94 is matched with a square opening 96 in the bottom wall 98 of the barrel or reservoir 70. A square frame 100 is clamped to the boss by screws 102 with the marginal portions of the bottom wall 98 interposed as seen in Fig. 3. A paddle or flapper 104 fits with clearance within the square frame 100 and is hingedly mounted on a pivot 106 secured in lugs 108 of the frame 100. A spring 110 coiled about the pivot 106 reacts against the frame and against the upper side of the flapper 104 to urge the latter toward the cavity 76 and the upper port 78 in the cylinder 74.

The plunger 80 is cut away to provide a cam surface 112, and a two-part pin transmits movement from the cam 112 to the flapper 104. One part 114 of the pin is slidably mounted in the wall of the cylinder 74 and is formed with a tapered tip 116 engaging in the concave end of the pin member 118 which is loosely secured by a rivet 120 in the flapper 104 at a short distance from the axis of its pivot 106. The push pin is made in two parts primarily for convenience of assembly, but operates substantially like the pin 60 of the structure previously described. On the feeding stroke of the plunger 80 the cam surface 112 moves the pin 114, 118 upwardly to swing the flapper 104 away from the upper port 78 and out of the continuation of the cavity 76 which is formed by the frame 100. It will be understood that the barrel or reservoir 70 includes a suitable follower piston which urges the grease downwardly into the cavity 76 and into the space enclosed in the frame 100 so that during the return stroke of the plunger 80 as the cam surface 112 permits the pin 114, 118 to move downwardly, the spring 110 urges the paddle or flapper 104 into the frame 100, pressing and compacting the grease therein and forcing it through the ports 78 into the cylinder 74 and tending to break down any voids or air pockets therein in the manner already described.

From the foregoing it will be clear that I have provided a novel improvement in grease guns which includes means operating automatically to disperse air pockets in the grease, and to supplement atmospheric pressure by the provision of additional mechanical pressure for forcing the grease into the cylinder.

While I have shown and described preferred embodiments of my invention, it will be apparent that numerous variations and modifications thereof may be made without departing from the underlying principles of the invention, and I therefore desire by the following claims to include and cover all such variations and modifications by which substantially the results of the invention may be obtained through the use of substantially the same or equivalent means.

I claim:

1. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, a flapper having an area substantially greater than that of the port hingedly mounted adjacent said port for swinging movement of said area toward and from the port, means connected to the plunger for reciprocating said plunger, and means for swinging said flapper in timed relation to the movement of said plunger.

2. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, a flapper having a flat surface and hingedly mounted adjacent said port for swinging movement of said surface toward and from the port, means connected to the plunger for reciprocating said plunger, spring means independent of the plunger constantly urging said flapper toward the port, and means actuated intermittently by the stroke of the plunger in one direction to swing the flapper away from said port.

3. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, a flapper having an area substantially greater than that of the port hingedly mounted adjacent said port for swinging movement of said area toward and from the port, means connected to the plunger for reciprocating said plunger, spring means independent of the plunger urging said flapper toward the port, a pin slidable in the head transverse of the cylinder axis with one end engaging the flapper and the other end engaging the plunger, said plunger having a cam surface operative through said pin to swing the flapper away from said port during the feeding stroke of the plunger.

4. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, a flapper of substantial area greater than that of the port hingedly mounted adjacent said port for swinging movement of said area toward and from the port, means connected to the plunger for reciprocating said plunger, said plunger closing said port in its feeding stroke and expelling grease through the outlet and uncovering said port in its return stroke yielding means urging said flapper toward said port during the return stroke of the plunger, and means swinging the flapper away from said port during the feeding stroke of the plunger.

5. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, the head including a grease pocket open toward the barrel with said port leading from the pocket into the cylinder, a flapper hingedly mounted for swinging movement into and out of said pocket, the area of the flapper approximating the cross-sectional area of the pocket, means for reciprocating the plunger, and means operative to swing said flapper in timed relation to the movement of the plunger.

6. In a grease gun, the combination of a head having a feed cylinder, a plunger reciprocable therein, a barrel secured to the head, said head having a port which connects the interior of said barrel with the cylinder, a follower piston in the barrel, a check valved outlet for the cylinder, a flapper hingedly mounted adjacent said port for swinging movement toward and from the port, means connected to the plunger for reciprocating said plunger, a flange projecting into the barrel from said head in peripheral proximity to said flapper when the flapper is swung toward the port, said flapper moving out of the area embraced by the flange when the flapper swings away from said port, and means for swinging said flapper in timed relation to the movement of said plunger.

7. In a grease gun, the combination of a head having a feed cylinder, a plunger reciprocable therein, a grease reservoir adjoining the head, said head having a pocket and a port leading from said pocket through which port the grease moves from the interior of the reservoir into said cylinder, a check valved outlet for said cylinder, means to reciprocate the plunger, a member having an area approximating the cross-sectional area of said pocket and mounted in the reservoir adjacent said port and movable into and out of the pocket for compacting the grease in and around the port, and means for so moving said member when the plunger is reciprocated.

8. In a grease gun as defined in claim 7, the means for moving said member comprising yielding means operating independently of the plunger to urge said member into the pocket, and means actuated intermittently by the plunger to move said member out of said pocket.

ERNEST W. DAVIS.

REFERENCES CITED

The following references are of record in the file of this patent:

UNITED STATES PATENTS

| Number | Name | Date |
| --- | --- | --- |
| 2,237,189 | McCormack et al. | Apr. 1, 1941 |
| 1,690,058 | Davis | Oct. 30, 1928 |
| 1,894,274 | Jacques | Jan. 17, 1933 |
| 2,062,447 | Davis | Dec. 1, 1937 |

FOREIGN PATENTS

| Number | Country | Date |
| --- | --- | --- |
| 623,866 | Germany | Jan. 7, 1936 |